UNITED STATES PATENT OFFICE.

ERNEST L. RANSOME, OF SAN FRANCISCO, CALIFORNIA.

IMPROVEMENT IN THE MANUFACTURE OF ARTIFICIAL STONE.

Specification forming part of Letters Patent No. 133,887, dated December 10, 1872.

*To all whom it may concern:*

Be it known that I, ERNEST LESLIE RANSOME, of Greenwich, county of Kent, England, at present residing in the city of San Francisco, in the county of San Francisco and State of California, have invented and discovered new and useful Improvements in the Manufacture of Artificial Stone; and I do hereby declare that the following is a full and exact description of the same, reference being had to the accompanying drawing and to the letters of reference marked thereon.

My improvement is principally based upon the process patented in England by Frederick Ransome, of England, on the 29th of April, 1871, and for which an application for a patent for the United States has been made. This patent is as follows:

"The object of my present invention is to improve the manufacture of artificial stone, which will harden without the subsequent application of a solution of a soluble salt of an alkaline earth. For this purpose I combine finely-divided silica in a soluble state, obtained either artificially or naturally, with a solution of silicate of soda or potash, or of a mixture of such silicates, lime, clay, sand, chalk, or other material.

"The object of putting the finely-divided silica in a soluble state into the compound is, that it may combine with the caustic soda or potash set free by the action of the lime or other substance capable of rendering such soda or potash caustic on the silicate solution.

"The lime employed may be in the state of quicklime, or it may be hydrated or partially hydrated; or substances containing lime, such as Portland or other hydraulic cements or limes or other substances capable, of acting in like manner to lime upon the solution of soluble silica, may be employed in place of lime.

"The substances to be combined, as well as the proportions thereof, may be varied very considerably, according to the object desired to be obtained; but for ordinary building-stones I find the following combination suitable, viz: Six parts, by measure, of sand; two parts, by measure, of powdered chalk; one part, by measure, of powdered soluble silica; one part, by measure, of lime or Portland cement; one part, by measure, of solution silicate soda. Specific gravity, 1.700.

"I prefer to mix or grind together the lime or Portland cement and soluble silica first, to which I then add the sand and chalk; and when the above are thoroughly mixed together in the dry state, I add the solution of silicate of soda, when the whole are incorporated together in a suitable mixing-mill.

"Sometimes I find it desirable to add a small quantity of water to increase the plasticity of the compound, which should be pressed into the molds or forms as soon as possible, and allowed to set or harden gradually by the action of the atmosphere."

But by my present invention I unite finely-divided silica in a soluble state, mixed with lime, chalk, clay, sand, hydraulic cements, or other like substances, with a solution of caustic soda or potash, or of carbonate of soda or potash, or with a mixture of such solutions in place of the silicates of soda or potash; the object being to create all of the silicates of soda or potash in the mass, rather than to apply them thereto ready-made in the first instance.

The proportions of the several ingredients used may be greatly varied; and, in some cases, it is advisable to subject the stone, while forming, to heat and moisture.

It is customary, in some cases, after mixing the various substances together in a semi-liquid state, to pour the mixture into the mold or required shape; but by my present invention I pour or otherwise introduce the mixture into the mold or required shape in vacuum, and by this means I obtain a stone or product that is free from air-holes, bubbles, or vents, and that is stronger and more durable than that produced by the ordinary method; nor do I confine this portion of my invention to the materials described, for it is equally beneficial in casting or pouring metals, glass, plaster, mastic, sulphur, and the like substances. By this means I first dispense with the use of the more costly silicates. Secondly, I do away with the difficulty which exists in the former process by reason of the rapid setting of the mixture. Thirdly, I produce a better article at a less cost.

I am aware of the previous patents to Ransome, October 3, 1865, and June 12, 1866, and do not desire to cover in this application anything covered thereby; but

Having thus described my invention, what I claim, and desire to secure by Letters Patent, is—

1. The compound, manufactured with the material and in the manner herein described.

2. Casting or molding liquid or semi-liquid substances in vacuum.

In witness whereof I have hereunto set my hand.

ERNEST L. RANSOME.

Witnesses:
GEO. H. STRONG,
JOHN S. SMITH.